United States Patent [19]

Darrow

[11] 3,725,679

[45] Apr. 3, 1973

[54] FAIL-SAFE SIGNAL SHAPING CIRCUIT

[75] Inventor: John O. G. Darrow, Westmoreland, Pa.

[73] Assignee: Westinghouse Air Brake Company, Swissvale, Pa.

[22] Filed: Sept. 15, 1971

[21] Appl. No.: 180,635

[52] U.S. Cl. ..................307/268, 307/288, 307/313, 328/223

[51] Int. Cl. ..........................................H03k 5/01

[58] Field of Search ........328/25, 113, 223; 307/268, 307/282, 290, 288, 313

[56] References Cited

UNITED STATES PATENTS

| | | | |
|---|---|---|---|
| 2,926,244 | 2/1960 | Stryker | 328/25 |
| 2,954,527 | 9/1960 | Bradmiller | 328/223 X |
| 3,303,358 | 2/1967 | Krausz | 307/290 X |
| 3,411,096 | 11/1968 | Rainger et al. | 328/223 X |
| 3,497,723 | 2/1970 | Nelson | 307/268 X |
| 3,602,735 | 8/1971 | Lodi | 307/268 X |
| 3,609,405 | 9/1971 | Surprise | 307/268 X |

*Primary Examiner*—John S. Heyman
*Attorney*—H. A. Williamson et al.

[57] ABSTRACT

This disclosure relates to a fail-safe signal shaping circuit which removes the harmonic producing portions from a square-wave input signal. The signal shaping circuit includes an electronic switching circuit and a series resonant L-C circuit for transforming the leading edge of the square-wave input signal into one half cycle of a cosine wave and for transforming the trailing edge of the square-wave input signal into another half cycle of a cosine wave.

7 Claims, 2 Drawing Figures

PATENTED APR 3 1973 3,725,679

INVENTOR
John O. G. Darrow.
BY
John B. Sotak

FAIL-SAFE SIGNAL SHAPING CIRCUIT

My invention relates to a fail-safe shaping circuit and more particularly to an electronic circuit arrangement for removing sharp harmonic producing portions from a square wave signal by transforming the leading and trailing edges of the square wave signal into appropriate sections of a raised cosine wave so that the production of harmonics is minimized.

In certain types of signal and communication systems, such as railroad and mass and/or rapid transit operations, information and commands are conveyed from one location to another in coded form. Usually the coded format takes the form of a series of marks and spaces, such as a train of rectangular or square wave pulses. It will be appreciated that rectangular or square waves have sharp demarcation portions which are troublesome to various systems, particularly to systems which employ tuned circuits. The problem arises from the fact that a rectangular wave form contains an infinite number of harmonics of the fundamental frequency. It has been found that these harmonics are capable of interfering with the normal operation of other circuits in the system. For example, a harmonic of sufficient amplitude will pass through an unrelated circuit tuned to the frequency of the harmonic and will cause the circuit to perform its function, such as, picking up or energizing a relay or the like. In a vital system, this is wholly unacceptable in that a falsely operated circuit could establish a condition which could cause damage to the equipment or could result in injury or death to attending personnel. Thus, the harmonics should be removed from the coded signals prior to usage in a vital type of system. In an ordinary or non-vital system, it is desirable to eliminate the harmonics simply in order to prevent cross-talk and noise signals from interfering with other circuits. Another requirement of a vital operation is that each portion or circuit of the system must be capable of functioning in fail-safe fashion. Thus, under no circumstance should a critical circuit or component failure be permitted to simulate the input signal, namely, a square wave or the like, except at greatly reduced levels.

Accordingly, it is an object of my invention to provide a circuit arrangement for shaping the wave form of an input signal in order to remove the presence of harmonics therefrom.

Another object of my invention is to provide a fail-safe wave shaping circuit for removing sharp harmonic producing portions from an input wave-form.

A further object of my invention is to provide a fail-safe signal shaping circuit which transforms the leading and trailing edges of a square-wave signal into the respective half cycles of a raised cosine wave.

Yet another object of my invention is to provide a signal shaping circuit which removes harmonics from an input signal and which operates in a fail-safe manner.

Yet a further object of my invention is to provide a wave shaping circuit which reshapes the leading and trailing edges of a rectangular wave form into appropriate sections of a raised cosine wave-form.

Still another object of my invention is to provide a new and improved signal shaping circuit which removes harmonic frequency signals from a substantially square-wave form by transforming the leading edge of the wave form into one half cycle of a cosine wave and by transforming the trailing edge of the wave form into the other half cycle of a cosine wave.

Still a further object of my invention is to provide a wave shaping circuit which removes sharp harmonic producing portions of an input signal and which does it in a fail-safe fashion.

Still yet another object of my invention is to provide a fail-safe electronic signal shaping circuit arrangement including a switching circuit and a series L-C network which removes harmonic producing portions of an input signal by transforming each harmonic producing portion into a cosine function.

Still yet a further object of my invention is to provide a fail-safe wave shaping circuit including an electronic switching circuit and an inductance-capacitance circuit which is economical in cost, simple in construction, reliable, and efficient in operation.

Briefly, the present invention relates to a fail-safe signal shaping circuit which transforms the harmonic producing portions of a train of coded square wave input signals into cosine functions. The fail-safe signal shaping circuit includes an electronic switching circuit and a series resonant L-C circuit. The electronic switching circuit employs a pair of driving transistors and a pair of series connected driven transistors. The driving transistors are connected in cascade so that both transistors are simultaneously rendered conductive and nonconductive by the square-wave input signals. The conduction of the driving transistors causes one of the driven transistors to be conductive and causes the other driven transistors to be cut-off. The conduction of the one driven transistor establishes a charging circuit path for the series resonant L-C circuit so that the leading edges of the square-wave input signals are transformed into one half cycle of a cosine wave. Conversely, the nonconduction of the driving transistors causes the one driven transistor to cut-off and causes the other driven transistor to conduct. The conduction of the other driven transistor establishes a discharge circuit path for the series resonant L-C circuit so that the trailing edges of the square-wave input signals are transformed into another half cycle of a cosine wave.

The foregoing objects and other attendant features and advantages of my invention will become more fully evident from the following detailed description when considered in connection with the accompanying drawings wherein.

Figure 1:
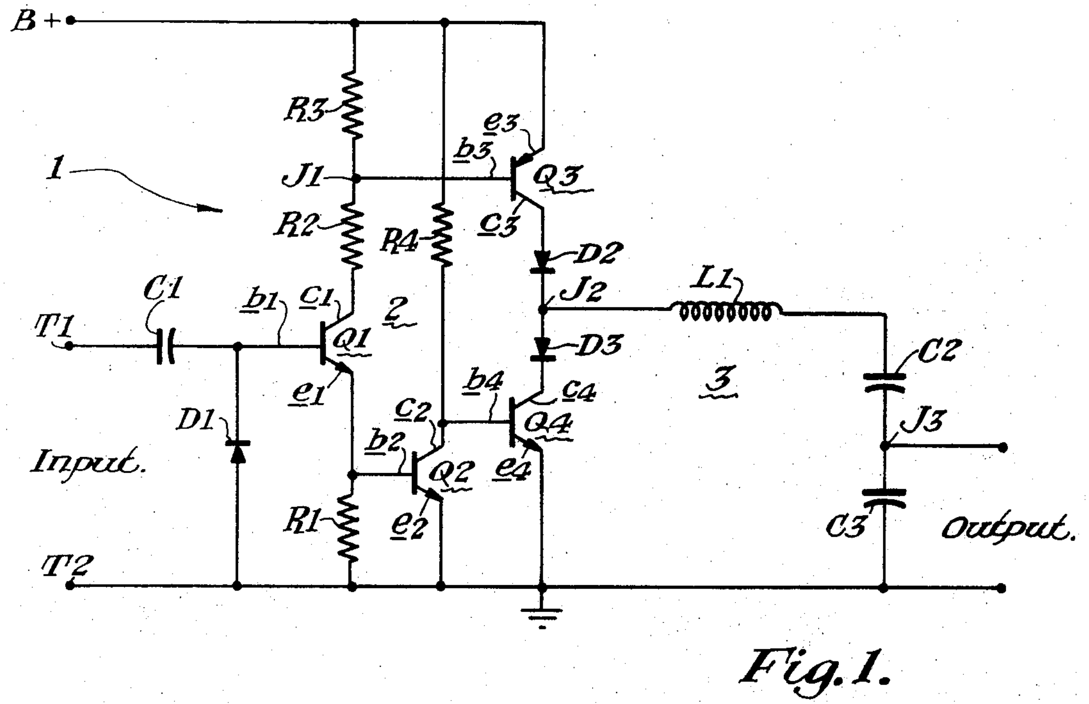
FIG. 1 is a schematic circuit diagram illustrating a preferred embodiment of the present invention.

Referring now to the drawings and in particular to FIG. 1 there is shown a fail-safe signal shaping circuit which is generally represented by the numeral 1. The signal or wave shaping circuit 1 includes a switching circuit generally characterized by the numeral 2, and a series-resonant circuit generally characterized by the numeral 3.

The switching circuit includes a driving network having a pair of cascaded transistors and a driven network having a pair of series connected transistors. The first stage of the driving network includes an NPN transistor Q1 having an emitter electrode *e*1, a collector electrode *c*1, and a base electrode *b*1. The base electrode *b*1 of transistor Q1 is connected to input terminal T1 through coupling capacitor C1. The emitter electrode *e*1 of transistor Q1 is connected to a reference potential, such as ground, by resistor R1. A diode D1 has its cathode connected to the base electrode *b*1 of transistor Q1. The anode of diode D1 is directly connected to ground. The diode D1 limits the amount of reverse voltage that can be applied to transistor Q1 to prevent damage to the emitter-to-base diode of the transistor Q1 and also results in symmetrical clipping of input signal. The collector electrode *c*1 is connected to positive terminal B+ of a suitable source of d.c. supply patential (not shown) by a pair of series connected resistors R2 and R3.

The second stage of the driving network includes an NPN transistor Q2 having an emitter-electrode *e*2, a collector electrode *c*2, and a base electrode *b*2. The base electrode *b*2 of transistor Q2 is directly connected to the emitter electrode *e*1 of transistor Q1. The emitter electrode *e*2 of transistor Q2 is directly connected to ground while the collector electrode *c*2 of transistor Q2 is connected to the positive terminal B+ by resistor R4.

The driven network of the switching circuit includes a first PNP transistor Q3 having an emitter electrode *e*3, a collector electrode *c*3, and a base electrode *b*3. The base electrode *b*3 of transistor Q3 is directly connected to a junction point J1 formed between resistors R2 and R3. The emitter electrode *e*3 of transistor Q3 is directly connected to the positive terminal B+ of the d.c. supply source. The collector electrode *c*3 of transistor Q3 is connected to the anode of an isolation diode D2. The cathode of the diode D2 is connected to a junction point J2.

The driven network also includes a second NPN transistor Q4 having an emitter electrode *e*4, a collector electrode *c*4, and a base electrode *b*4. The base electrode *b*4 of transistor Q4 is directly connected to the collector electrode *c*2 of transistor Q2 while the emitter electrode *e*4 of transistor Q4 is directly connected to ground. The collector electrode *c*4 of transistor Q4 is connected to the cathode of an isolation diode D3 while the anode of the diode D3 is connected to the junction point J2. Thus, it will be seen that the conductive condition of transistor Q3 is controlled by the transistor Q1 while the conductive condition of transistor Q4 is controlled by transistor Q2.

The series resonant circuit includes an inductor L1 and a pair of capacitors C2 and C3. One end of the inductor L1 is connected to the junction point J2 while the other end of the inductor L1 is connected to the upper plate of the capacitor C2. The lower plate of the capacitor C2 is coupled to the upper plate of a capacitor C3 while the lower plate of capacitor C3 is directly connected to ground. The output is derived from across capacitor C3, namely, from across junction point J3 and ground. The capacitors C2 and C3 form a capacitance divider wherein a preselected amount of output voltage is derived from across capacitor C3. For example, the capacitance divider permits the output voltage to be reduced to a given level and allows the d.c. zero line to be moved to an optimum position.

Figure 2:
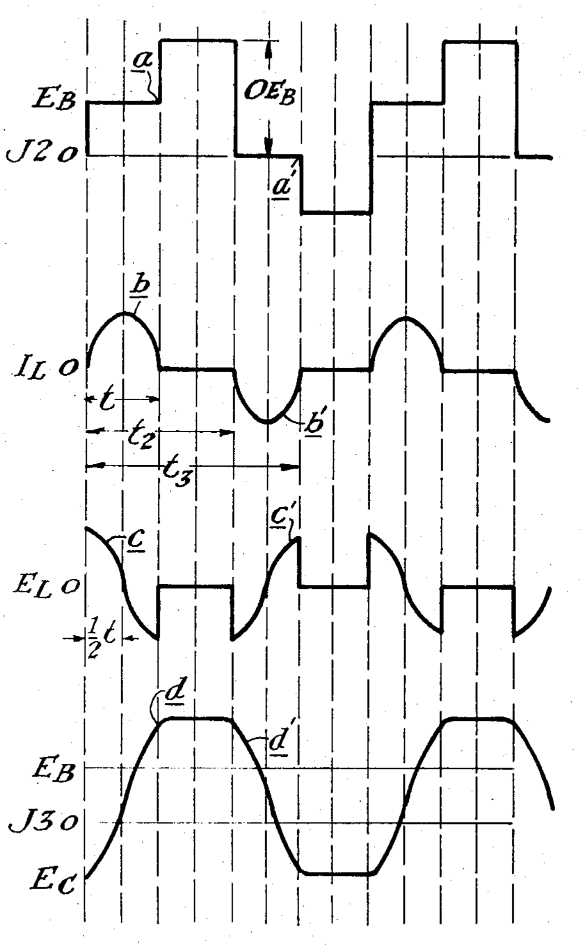
FIG. 2 is a deagrammatic illustration of a series of wave-forms which will be helpful in understanding the theory and operation of the present invention shown in FIG. 1.

In describing the operation, let us initially assume that the circuit is intact and is operating properly and that a series of coded square or rectangular waves are applied across input terminals T1 and T2. After a few cycles of operation, the output wave form will assume the desired raised cosine wave-form. Thus, when a positive voltage appears on input terminal T1, the transistor Q1 is rendered conductive. The conduction of transistor Q1 causes forward biasing of the base emitter of the transistor Q2 so that transistor Q2 is also rendered conductive. The conduction of transistor Q2 zero biases transistor Q4 so that transistor Q4 is cut-off. However, the conduction of transistor Q1 causes forward biasing of transistor Q3 so that transistor Q3 is rendered conductive. The conduction of transistor Q3 establishes a circuit path from the positive terminal B+ through emitter electrode *e*3, collector electrode *c*3, diode D2, through the series resonant circuit including inductor L1 and capacitors C2 and C3 to ground. Thus, the voltage at junction point J2 will suddenly rise to the B+ level, as shown in curve *a* of FIG. 2. The voltage swing in unimpeded since transistor Q4 is cut-off. The increase in voltage causes current to begin flowing through the L-C circuit, and the amount of current flowing through the inductor L1 is represented by the wave-form as shown by the curve *b* representing $I_L$. The current rises from a zero value to a maximum positive peak value and then returns to a zero level within a period of time dependent upon the L-C characteristic of the circuit. The reversal of current in inductor L1, which would normally occur in a resonant circuit, is prevented by isolation diode D2. When the current through and the voltage across inductor L1 return to zero, the junction J2 will be at the same potential as the voltage across C2 and C3, which will be the supply voltage multiplied by the Q of the resonant circuit formed by C1, C2 and C3. Conversely, the initial voltage across the inductor is at a maximum level but is 90° out-of-phase with the current as shown by the curve *c* of $E_L$. At ½*t*, the voltage $E_L$ passes through the zero point, and then reaches a maximum negative level at times *t* at which time it quickly returns to the zero level. Initially, the voltage across capacitors C2 and C3 is at some negative value since $E_C$ is a function of $E_B$ and E , namely, $E_C= E_B- E_L$. The charging current builds up the voltage across the capacitors C2 and C3. Thus, the output voltage developed across capacitor C3 and appearing at junction J3 follows the wave form as shown by curve *d*, namely, a raised cosine wave. It will be appreciated that the rise time of the output wave form *d* is equal to one-half of a cycle of the resonant frequency of the L-C network. Thus, the output voltage across capacitor C3 will continue to rise until a maximum level is reached at time *t*, as shown by curve *d* in FIG. 2. Thus, the leading edge of the pulse *a* is transformed into a gradual rising cosine wave so that the sharp harmonic producing portions are removed from the rectangular input signal. At time *t* the voltage at junction point J2 is raised to Q times $E_B$ where Q is the gain of the resonant circuit. The output voltage across capacitor C3 will remain at its maximum positive level throughout the remainder of the marking pulse. That is, since the current is at zero and the voltage across the inductor has returned to zero, the voltage across C2 and C3 will stop charging, as shown by curve *d*. It will be noted that no power is lost during the period from $t$ to $t_2$, namely, during the zero current period or dead space time since diode D2 blocks reverse current flow to the B+ supply terminal and the nonconducting transistor Q4 blocks current flow to ground and resistive value of resistor R5 is relatively high so that little change occurs during this period.

Now when the trailing edge of the marking pulse appears at the input terminal T1, the transistor Q1 will revert to a nonconducting condition since the input voltage is zero during the ensuing spacing period. The nonconduction of transistor Q1 removes the forward biasing from base-emitter electrodes of transistor Q3 so that transistor Q3 is rendered nonconductive. In addition, the nonconduction of transistor Q1 removes the forward biasing from transistor Q2 so that it is rendered nonconductive. The nonconduction of transistor Q2 causes a positive biasing voltage to appear on the base electrode b4 so that transistor Q4 is rendered conductive. The conduction of transistor Q4 establishes a discharge circuit path for the series resonant frequency circuit through diode D3 and the base-emitter electrodes of transistor Q4. The conduction of the transistor Q4 pulls the junction point J2 down to a zero potential or ground level, as shown by the curve $a'$. *Thus, at time* $t_2$ the current $I_L$ begins flowing through inductor L1 in the reverse direction and goes through a negative cycle between $t_2$ and $t_3$ as shown by the curve $b'$. *Also at time* $t_2$ the voltage across inductor $E_L$ instantly goes to a maximum negative level and gradually moves in a positive direction until time $t_3$ at which time it suddenly drops to a zero value as shown by the curve $c'$. Isolation diode D3 prevents the resonant circuit from causing current to flow in the reverse direction. During this period the voltage across capacitor C3 gradually decreases as shown by the curve $d'$ which in fact is the other half cycle of the cosine wave form. Thus, during the trailing edge, the output signal also follows a cosine wave having a decay time which is proportional to one-half cycle of the resonant frequency of the L-C circuit. Again, the sharp harmonic producing portions of the input signal are removed so that unwanted harmonic frequencies are removed from the output. The output wave will assume a maximum negative level and will remain at this level until a subsequent marking pulse appears on the input terminal T1. That is, since the current is at zero and the voltage across the inductor has returned to zero, the voltage across capacitors C2 and C3 will stop changing. It will be appreciated that the peak-to-peak amplitude of the output voltage developed across capacitor C3 is C3/C2+C3 times the total voltage developed across capacitors C2 and C3, wherein the total voltage is Q times the voltage B+. It will be appreciated that each and every subsequent marking pulse of the train will cause a similar shaping effect so that no harmonics will exist in the output voltage developed across capacitor C3. Thus, the square or rectangular input signals are transposed into sections of raised cosine waves so that all harmonic frequencies are removed from the final output wave form.

Further, as previously mentioned, the pulse shaping circuit 1 operates in a fail-safe manner in that the failure of any active or passive element results in its inability to perform the necessary switching function. The most critical failure that is possible is the likelihood of turns shorting in the inductor L1. However, while the shorting of turns causes a squaring of the output voltage, it will be appreciated that the amplitude of the output voltage will be only 1/Q times as great. Thus, it can be seen that any other failure which tends to distort the desired waveshape also greatly reduces the amplitude of the output. Therefore, the subsequent amplitude sensitive circuits will not be affected by such any spurious frequency signal generation. Thus, the pulse or wave shaping circuit 1 will at no time interfere with other frequency sensitive circuits of the system. Thus, the pulse shaping circuit 1 operates in a fail-safe fashion to remove harmonic frequencies by transposing the steep wave form into a raised cosine wave form.

It is understood that while my invention has been described in relation to railroad and/or mass transit operations, it is quite obvious that its use is not merely limited thereto but may be employed in other surroundings and environments which have similar operating conditions and require the removal of harmonic frequency signals. It will also be apparent that some modifications and changes can be made in the presently described invention, and, therefore, it is understood that all changes, equivalents, and modifications within the spirit and scope of the present invention are herein meant to be included in the appended claims.

Having thus described my invention, what I claim is:

1. A fail-safe signal shaping circuit for removing sharp harmonic producing portions from an input signal comprising, a source of input signals, an electronic switching circuit connected to said source of input signals, said switching circuit including a first and a second driving transistor and a first and a second driven transistor, said first driving transistor controlling the conductive condition of said first driven transistor and said second driving transistor controlling the conductive condition of said second driven transistor so that said first and said second driven transistors are alternately rendered conductive, and a series L–C circuit connected to said first and said second driven transistors wherein the conduction of said first driven transistor causes the leading edge of said input signals to be transformed into one half cycle of a raised cosine wave form and the conduction of said second driven transistor causes the trailing edge of said input signals to be transformed into another half cycle of a raised cosine wave form.

2. A fail-safe signal shaping circuit as defined in claim 1, wherein a first isolating diode is connected between said L-C circuit and said first driven transistor and a second isolating diode is connected between said L-C circuit and said second driven transistor.

3. A fail-safe signal shaping circuit as defined in claim 2, wherein said first and said second isolating diodes are connected in series and are poled in the same direction.

4. A fail-safe signal shaping circuit as defined in claim 1, wherein said L-C circuit includes a pair of capacitors forming a capacitance divider.

5. A fail-safe signal shaping circuit as defined in claim 1, wherein said first and said second transistors are a pair of series connected complementary transistors.

6. A fail-safe signal shaping circuit as defined in claim 1, wherein said first and said second driving transistors are a pair of cascaded transistors.

7. A fail-safe signal shaping circuit as defined in claim 2, wherein the inductor of said L-C circuit is connected to the junction point of said series connected first and second isolating diodes.

* * * * *